Feb. 26, 1952  L. R. HIVELY  2,587,318
ALL STOCK CONTROL GATE
Filed June 2, 1950  2 SHEETS—SHEET 1
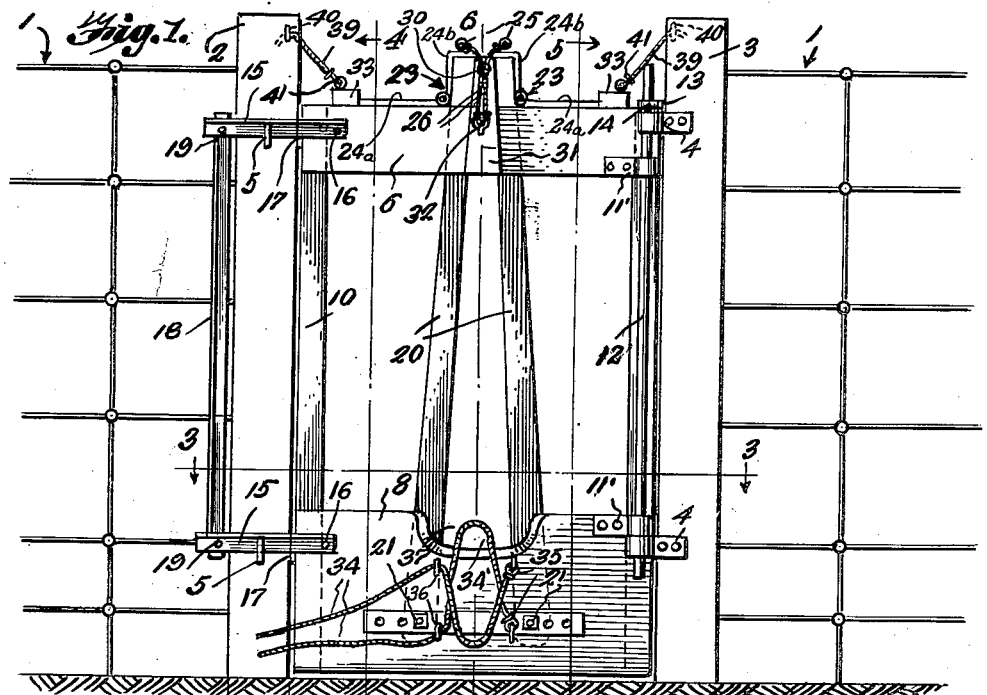
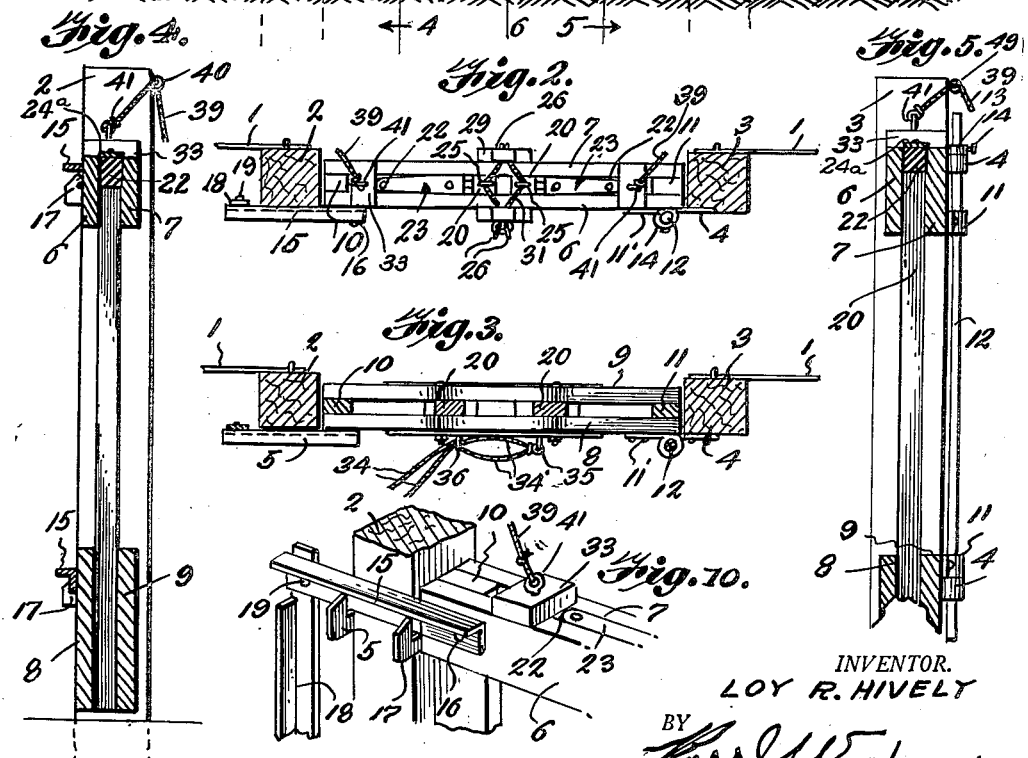
INVENTOR.
LOY R. HIVELY
BY
ATTY.

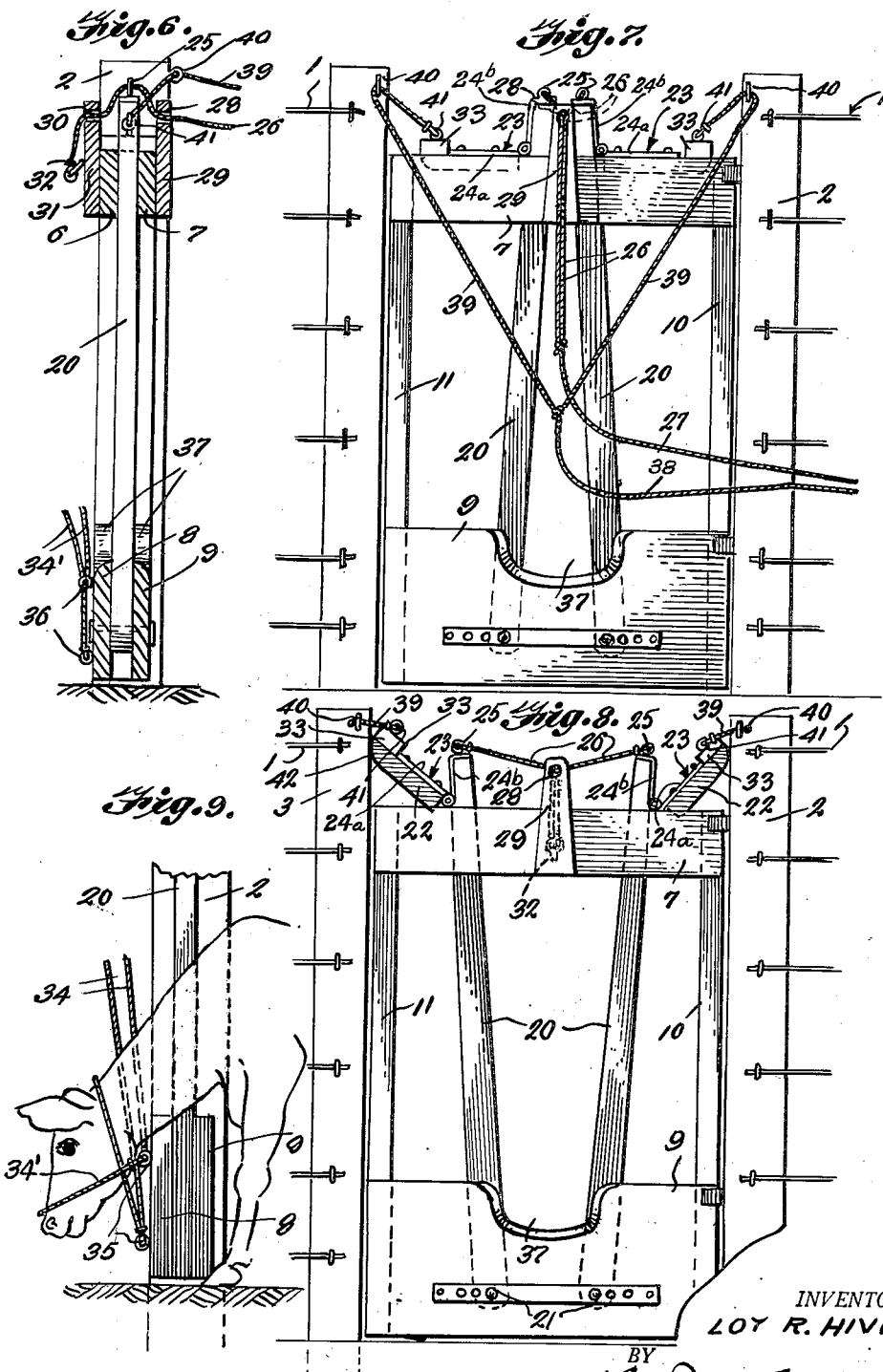

Patented Feb. 26, 1952

2,587,318

UNITED STATES PATENT OFFICE 2,587,318

ALL STOCK CONTROL GATE

Loy R. Hively, Bridgewater, Va., assignor of one-half to E. S. Ashby, Harrisonburg, Va.

Application June 2, 1950, Serial No. 165,745

7 Claims. (Cl. 119—96)

This invention relates to an animal holding gate and it is one object of the invention to provide a gate which may be mounted in a fence or wall of a barn or other building and serve as means for catching and holding cattle, horses, pigs, and other animals while removing horns and performing other operations upon the animal.

Another object of the invention is to provide a gate which may be securely held closed while an animal is being caught and held and which may be released and opened in order to allow the animal to leave a field or a building with which the gate is associated after the animal has been dehorned or otherwise operated upon.

Another object of the invention is to provide a gate with catching means consisting of bars vertically disposed and pivoted at their lower ends for tilting movement transversely of the gate from a spread position towards each other to a position for gripping the animal about its neck and holding the animal without danger of choking the animal or causing the neck of the animal to be broken.

Another object of the invention is to provide the gate with keepers or stops which are pivoted to upper ends of the bars and are readily moved into and out of position for securing the bars in a closed or clamping position, the keepers also being readily movable to a raised position for releasing the bars and permitting them to be swung away from each other to a spread position for releasing the animal.

Another object of the invention is to provide the gate with bars and keepers which may be operated by ropes of such length that a person may stand at quite a distance from the gate while closing or spreading the bars and thus eliminate danger of a person being injured by the animal.

Another object of the invention is to provide the gate with lines so arranged that they may be engaged about the head of an animal and then pulled upon the drawn head downwardly to a lowered position where it is held while horns are being removed or a nose ring applied.

Another object of the invention is to provide an animal catching gate which is of simple construction, very strong, and easy to operate.

The invention is illustrated in the accompanying drawings wherein:

Fig. 1 is a front view showing the improved animal catching gate installed in a fence.

Fig. 2 is a view showing the gate in top plan and posts of the fence in cross section.

Fig. 3 is a sectional view taken transversely through the gate and the fence posts along the line 3—3 of Figure 1.

Fig. 4 is a sectional view taken vertically through the gate along the line 4—4 of Figure 1.

Fig. 5 is a similar view taken along the line 5—5 of Figure 1, parts being broken away.

Fig. 6 is a sectional view taken vertically between the gripping bars, the view being taken along the line 6—6 of Figure 1.

Fig. 7 is a view in elevation looking at the inner face of the gate with the bars in gripping position.

Fig. 8 is a view similar to Figure 7 showing the bars swung away from each other to a releasing or opened position.

Fig. 9 is a view showing a calf caught in the gate.

Fig. 10 is a fragmentary perspective view of the upper portion of the gate with its latch in a securing position.

This improved animal catching gate may be mounted in a fence, wall of a barn or other building, or at an end of a chute into which animals to be dehorned, or otherwise operated upon, are driven and confined. In the illustration the gate has been shown mounted in a fence 1 which is formed of wire and includes posts 2 and 3 between which the gate is located. The post 3 carries hinges 4 and the post 2 carries keepers 5 for engagement by latches which releasably hold the gate closed.

The gate may be formed of wood, metal, or other suitable material and has upper front and rear cross bars 6 and 7 and lower front and rear cross bars 8 and 9. These cross bars have their end portions secured against vertical bars 10 and 11 of the gate. Hinges 11' are carried by the cross bars 6 and 8 and through these hinges is passed a hinge rod 12 which is secured through the hinges 11 and carries a collar 13 which rests upon the upper hinge 4 and is secured in place upon the hinge rod by a set screw 14. The gate may therefore be shifted vertically to a position in which its lower end clears the ground or the floor of a barn and the collar then shifted along the rod and secured in a position in which it rests upon the upper hinge 4 and prevents downward movement of the gate to a position in which its lower end would scrape along the ground and prevent the gate from swinging freely to opened and closed positions.

Latches 15, which are formed from strips of angle metal, are pivoted to the upper and lower cross bars 6 and 8 by bolts or equivalent pivots 16 for vertical tilting movement into and out of engagement with the keepers 5, downward movement of the latches being limited by stops 17 carried by the free side portion of the gate. A rod 18 formed from a strip of angle metal extends vertically between the latches and has its upper and lower ends pivoted to the latches by pins 19. By grasping this rod or bar 18 the latches may be tilted upwardly to a releasing position and the gate swung to its opened position. The bar is then released and then the gate is swung to its closed position the latches 15 will move into engagement with the keepers 5 and securely hold the gate closed.

The outer upper and lower cross bars 6 and 8 are held in spaced relation to the companion inner cross bars 7 and 9 by the side bars 10 and 11 which fit between them and between these spaced cross bars are disposed vertically extending gripping bars or yokes 20 which are pivotally mounted for tilting movement transversely of the gate by bolts 21 passing through their lower ends and through the two lower cross bars 8 and 9. Abutment blocks 22 are pivotally mounted for vertical tilting movement by hinges 23 which extend longitudinally of the blocks or keepers and have their outer leaves 24a secured to the blocks and their inner leaves 24b turned upwardly and secured against upper portions of the two yokes. Upper ends of the inner hinge leaves 24b overlap upper ends of the yokes and carry eyes 25 through which pass branch lines 26 of a rope 27. The branch lines slidably pass through an opening 28 formed at the upper end of an arm 29 carried by and extending upwardly from the upper inner cross bar 7 and after being passed through the eyes 25 are passed through an opening 30 at the upper end of an arm 31 carried by the cross bar 6 and secured to an eye 32 carried by the arm 31 and spaced downwardly from the opening therein. It will thus be seen that a person standing at a distance from the gate may swing the yokes towards each other after an animal has passed its head through space between the yokes and the neck of the animal will be gripped from opposite sides and the animal prevented from withdrawing its head. Cross heads 33 at free ends of the abutment blocks limit downward movement thereof beyond a horizontal position between the upper cross bars. Portions 34' of ropes 34 which are secured to eyes 35 carried by the outer lower cross bar 8 and slidably passed through eyes 36 also carried by the outer lower cross bar may then be drawn upwardly and downwardly in crossing relation to each other, as shown in Figure 1, and fitted about the animal's head to form a loop which is tightened and holds the animal's head in the lowered position shown in Figure 9. The head of the animal will thus be firmly held in a lowered position and its horns may be easily cut off as the animal can not move its head during the dehorning operation. Recesses 37 are formed in upper edge portions of the lower cross bars 8 and 9 to accommodate the under portion of the neck of the animal when drawn downwardly.

In order to allow the yokes to be moved away from each other to an opened or releasing position the abutment blocks 22 must be shifted upwardly from the position shown in Figures 1 and 7 to the position shown in Figure 8. In order to permit this to be done by a person standing a safe distance from the gate, there has been provided a line or rope 38 having branch lines 39 which are slidably passed through eyes 40 carried by the posts and attached to eyes 41 carried by the cross heads 33 of the abutment blocks. When pull is exerted upon the rope 38 its branch lines 39 exert upward pull upon the free end portions of the abutment blocks 22 and swing them upwardly to a tilted position and also pull the yokes away from each other. As the abutment blocks have bevelled free ends 42 they will readily slide upwardly along the posts 2 and 3 as the yokes are moved away from each other to the releasing position.

Having thus described the invention, what is claimed is:

1. An animal holder comprising a gate having a hinge structure at one side edge for pivotally mounting the gate, said gate having vertical side bars, front and rear upper and lower cross bars extending between said side bars and secured against front and rear faces thereof, the lower cross bars having upper edges formed midway the width of the gate with aligned recesses for receiving the neck of an animal thrust through the gate, bars disposed vertically adjacent opposite sides of said recesses and constituting yokes having lower ends pivotally mounted between the lower cross bars and upper end portions extending between and upwardly from the upper cross bars, arms secured against outer faces of the upper cross bars and extending upwardly from the upper bars between upper ends of said yokes, said arms being formed with aligned openings at their upper ends, hinges having inner leaves secured to upper portions of said yokes and outer leaves extending from the yokes towards opposite side bars of the gate, blocks carried by the outer leaves of said hinges and extending downwardly therefrom and fitting between the upper cross bars and extending longitudinally thereof with their outer ends in position for abutting engagement with the side bars to hold the yokes adjacent each other in a gripping position, cross heads carried by outer ends of said blocks for resting upon the upper cross bars and limiting downward movement of the blocks between the upper cross bars, an operating line having branch lines extending therefrom and connected with the cross heads and serving to swing the blocks upwardly to a raised position allowing movement of the yokes away from each other to a releasing position when the line is pulled upon, and a second operating line having branch lines extending therefrom and slidably passing through the openings of the arms and secured to one arm, portions of the branch lines of the last mentioned operating line being slidably passed through eyes at upper ends of the yokes and serving to pull the yokes towards each other when pull is exerted upon the said operating line.

2. The structure of claim 1 wherein the front lower cross bar carries sets of upper and lower eyes disposed under opposite side portions of its neck-receiving recess, and lines secured to the eyes under one side portion of the recess and slidably passing through the eyes under the other side portion of the recess and adapted to be spread upwardly and downwardly and disposed in crossed relation to each other between the eyes and looped about an animal's head to hold the head in a lowered position while dehorning the animal.

3. An animal holder comprising a gate movable to opened and closed positions and having vertical side bars and upper and lower front and rear cross bars between which the side bars are secured vertical bars constituting yokes having lower ends pivotally mounted between the lower cross bars and upper portions passing between the upper cross bars and projecting upwardly therefrom, said yokes being movable transversely of the gate to opened and closed positions, abutment blocks pivotally connected with upper end portions of said yokes for vertical tilting movement from a raised position to a lowered position in which they fit between the upper cross bars and extend longitudinally thereof in position for abutting engagement of their free ends with the side bars and prevent movement of the yokes away from each other to the opened position, an operating line having branch lines connected with said blocks and serving to move the blocks upwardly to a releasing position permitting movement of the yokes away from each other when the operating line is pulled upon, arms extending upwardly from the upper cross bars between said yokes and formed with aligned openings, and a second operating line having branch lines extending therefrom and passed through the aligned openings and secured to one arm, portions of the branch lines of the second operating line between the arms being slidably connected with upper ends of the yokes and serving to pull the yokes towards each other to a gripping position where they are held by the blocks when the second operating line is pulled upon.

4. An animal holder comprising a gate movable to opened and closed positions and having vertical side bars and upper and lower front and rear cross bars between which upper and lower ends of the side bars are secured, vertical bars constituting yokes and having lower ends pivotally mounted between the lower cross bars and upper portions passing between the upper cross bars and projecting upwardly therefrom, said yokes being tiltable transversely of the gate to opened and closed positions, abutment members pivoted to said yokes for vertical tilting movement into and out of position between the upper cross bars adapting them to have abutting engagement with the side bars and prevent movement of the yokes away from each other, cross heads carried by said members and limiting downward movement thereof between the upper cross bars, an operating line having branch lines connected with free end portions of said abutment members and serving to raise the said abutment members and draw the yokes away from each other towards a releasing position when pull is exerted upon the operating line, and means connected with the yokes for moving the yokes towards each other to a clamping position in which the yokes are spaced from upper ends of the side bars for a distance allowing the abutment members to move downwardly between the upper cross bars into position for holding the yokes in the clamping position.

5. An animal holder comprising a gate movable to opened and closed positions and having vertical side bars and upper and lower front and rear cross bars between which the side bars are secured, vertical bars constituting yokes having lower ends pivotally mounted between the lower cross bars and upper positions passing between the upper cross bars and projecting upwardly therefrom, said yokes being movable transversely of the gate to opened and closed positions, abutment members carried by upper portions of said yokes and movable vertically into and out of a horizontal position in which they extend from the yokes between the upper cross bars in position for engagement with the side bars to hold the yokes in a clamping position, an operating line connected with said abutment members and when pulled upon serving to move the said abutment members upwardly to a releasing position and draw the yokes away from each other towards a releasing position, and means connected with the yokes for moving the yokes towards each other to a clamping position in which they are spaced from the side bars a distance allowing the abutment members to move downwardly between the upper cross bars and engage the side bars to hold the yokes in the clamping position.

6. An animal holder comprising a gate having vertical side bars and upper and lower cross bars, yokes disposed vertically and having lower ends pivoted to the lower cross bar for movement towards and away from each other to clamping and releasing positions, abutment members pivoted to said yokes and tiltable vertically by gravity to an operative position for abutting edge faces of the side bars and holding the yokes in a clamping position, means connected with the abutment members for swinging the abutment members upwardly to a releasing position and exerting pull upon the yokes to move the yokes towards a releasing position, and means connected with the yoke for moving the yokes towards each other to a clamping position in which they are held by return movement of the said abutment members to their operative position.

7. An animal holder comprising a gate having vertical side bars and upper and lower cross bars, yokes disposed vertically and having lower ends pivoted to the lower cross bar for movement transversely of the gate towards and away from each other to clamping and releasing positions, abutment members movably carried by upper ends of said yokes and movable into and out of position for engaging the side bars and holding the yokes in a clamping position, front and rear arms carried by the upper cross bar and extending upwardly therefrom between upper portions of said yokes, and an operating line having branch lines slidably passing through an opening in one arm and secured at their ends to the other arm, said branch lines having portions between the arms slidably connected with upper ends of the yokes and serving to draw the yokes towards each other to a clamping position in which they are held by the same members when pull is exerted upon the operating line.

LOY R. HIVELY.

REFERENCES CITED

The following references are of record in the file of this patent:

UNITED STATES PATENTS

| Number | Name | Date |
| --- | --- | --- |
| 211,434 | Thatcher et al. | Jan. 14, 1879 |
| 405,574 | Luse et al. | June 18, 1889 |
| 2,523,459 | Wells | Sept. 26, 1950 |